United States Patent [19]

Tumminelli et al.

[11] Patent Number: 5,365,538
[45] Date of Patent: Nov. 15, 1994

[54] SLAB WAVEGUIDE PUMPED CHANNEL WAVEGUIDE LASER

[75] Inventors: Richard Tumminelli, Ashland; Farhad Hakimi, Watertown; John R. Haavisto, Marshfield Hills, all of Mass.

[73] Assignee: The Charles Stark Draper Laboratory Inc., Cambridge, Mass.

[21] Appl. No.: 969,783

[22] Filed: Oct. 29, 1992

[51] Int. Cl.$^5$ .................. H01S 3/07; H01S 3/091; G02B 6/00
[52] U.S. Cl. ..................... 372/66; 372/68; 372/72; 385/131; 385/132
[58] Field of Search .............. 372/66, 67, 68, 70, 372/72, 75, 33, 40, 6, 7; 385/132, 131, 136, 142, 129

[56] References Cited

U.S. PATENT DOCUMENTS

| | | | |
|---|---|---|---|
| 4,829,537 | 5/1989 | Baer | 372/66 |
| 4,889,401 | 12/1989 | Klement et al. | 385/131 |
| 5,119,460 | 6/1992 | Bruce et al. | 372/6 |
| 5,123,027 | 6/1992 | Lawrence | 356/350 |
| 5,185,847 | 2/1993 | Fevrier et al. | 385/131 |
| 5,206,925 | 4/1993 | Nakazawa et al. | 385/131 |
| 5,291,575 | 3/1994 | Yanagawa et al. | 385/142 |
| 5,295,209 | 3/1994 | Huber | 372/6 |

*Primary Examiner*—Rodney B. Bovernick
*Assistant Examiner*—Robert McNutt
*Attorney, Agent, or Firm*—Joseph S. Iandiorio

[57] ABSTRACT

A slab waveguide pumped channel waveguide laser includes a slab waveguide having a primary pump guiding layer with a first index of refraction and having first and second opposing faces and a peripheral edge including a mirrored surface, and cladding means having a second index of refraction lower than the first index of refraction, proximate the first and second opposing faces; at least one rare earth doped channel waveguide laser having a third index of refraction higher than the first index of refraction disposed in the primary guiding layer; and means for introducing pumping energy into the guiding layer to reflect between the mirror surfaces and energize the laser.

9 Claims, 3 Drawing Sheets

SLAB WAVEGUIDE PUMPED CHANNEL WAVEGUIDE LASER

FIELD OF INVENTION

This invention relates to an improved channel waveguide laser, and more particularly to a slab waveguide side pumped channel waveguide laser.

BACKGROUND OF INVENTION

Fiber optic lasers including both laser amplifiers and laser oscillators (referred to throughout this application as simply fiber lasers) require significant pumping energy supplied by directing the pumping energy into the core of the fiber optic element. Since the core of the fiber optic element is quite small, typically 5 $\mu$ in diameter, aligning the pumping source is difficult. Various techniques including the use of lenses and precise alignment tolerances are necessary to properly couple the pumping source into the core of the fiber optic element. Further, since the cores are so small the amount of power that can be introduced is quite limited. This problem was solved in fiber optic arrangements by using a double cladding design which increased the area available for coupling in the pumping source and allowed the energy to repeatedly internally reflect in the first cladding transversely passing through the core of the fiber optic element until the energy was absorbed to promote the action of the fiber optic lasers. See U.S. Pat. No. 4,826,288. Even in this approach, however, the coupling surface is confined to the area of the first cladding and so larger, more powerful pumping sources such as phased array diode lasers and other high-power sources cannot be easily accommodated.

More recently, end pumped channel waveguide lasers have been constructed in planar format. But these too suffer from the difficulties in aligning the pumping source to the end of the channel waveguide which is typically 5 $\mu$ square. While such devices are very appealing because of their superior manufacturability, the difficulty in pump coupling and the limited pump power which can be coupled has been a major drawback. This is especially problematic because pumping sources such as pumping lasers are constantly being improved to provide even greater power but with ever-increasing emitting apertures, thus making end coupling even more difficult.

SUMMARY OF INVENTION

It is therefore an object of this invention to provide an improved channel waveguide laser.

It is a further object of this invention to provide such an improved channel waveguide laser which is slab waveguide pumped.

It is a further object of this invention to provide such a slab waveguide pumped channel waveguide laser which is easier to pump.

It is a further object of this invention to provide such an improved channel waveguide laser which avoids limitations on the amount of pump power and the size of the pump which can be coupled to the laser.

It is a further object of this invention to provide such an improved channel waveguide laser which can be side pumped instead of end pumped.

It is a further object of this invention to provide such a slab waveguide pumped channel waveguide laser which naturally accommodates wide high power phased array diode pumps and even multiple wide high power phased array diode pumps.

It is a further object of this invention to provide such a slab waveguide pumped channel waveguide laser which accommodates simultaneous pumping of a number of waveguide lasers.

It is a further object of this invention to provide such a side pumped channel waveguide laser which is well suited to integrated optics fabrication techniques.

The invention results from the realization that a truly improved effective waveguide laser can be achieved using a slab waveguide which receives pumping energy and traps and reflects it back and forth repeatedly between its mirrored periphery to side pump the laser with multiple transverse passes until the energy is absorbed.

This invention features a slab waveguide pumped channel waveguide laser having a slab waveguide with a first primary pumped guiding layer with a first index of refraction. The primary guiding layer has first and second opposing faces and a peripheral edge which includes a mirrored surface. The slab waveguide also includes cladding means having a second index of refraction lower than the first index of refraction and disposed proximate the first and second opposing surfaces. There is at least one rare earth doped channel waveguide laser having a third index of refraction higher than the first index of refraction disposed in the primary guiding layer, and there are some means for introducing pumping energy into the guiding layer to reflect between the mirror surfaces and energize the laser.

In a preferred embodiment the primary layer may be planar or curved. The peripheral edge may have one side, two sides, three sides, four sides, or a multiplicity of sides: that is, it may be circular, crescent, square, polygonal, multifaceted, in short, it may take any configuration. The solid cladding means may include a solid cladding layer on one face and fluid on the other. The fluid may simply be air present in the ambient environment. Alternatively, there may be solid or fluid cladding on both faces. The means for introducing the pumping energy may include a window in the mirror surface on the peripheral edge or it may include a prism or other means on one or both of the faces.

DISCLOSURE OF PREFERRED EMBODIMENT

Other objects, features and advantages will occur to those skilled in the art from the following description of a preferred embodiment and the accompanying drawings, in which.

The slab waveguide pumped channel waveguide laser according to this invention may be accomplished by constructing a slab waveguide on a suitable substrate. The waveguide has a primary pumped guiding layer having a first index of refraction, and having first and second opposing faces with a peripheral edge. The peripheral edge includes a mirror surface for reflecting energy back and forth within the pump guiding layer. There are cladding means having a second index of refraction lower than the first index of refraction proximate the first and second opposing faces to effect the wave guiding action of the pump guiding layer. There is at least one rare earth doped channel waveguide laser having a third index of refraction higher than the first index of refraction disposed in the primary guiding layer. A window in the mirrored periphery or a prism or similar device on either or both faces of the pump guiding layer is used to introduce pumping energy into the pump guiding layer so that it is reflected back and forth repeatedly between the mirrored peripheral surface to energize the one or more channel waveguide lasers disposed in the pump guiding layer. The slab waveguide and the channel waveguide lasers may be made in a planar or curved configuration and the peripheral edge may have a single side, as when the slab waveguide has a circular shape, or it may have two sides when it is lenticular or crescent-shaped, three sides when it is triangular shaped, or four or more sides when it has a rectangular or other multifaceted or polygonal form. The cladding means may include a solid cladding on one face and a fluid on the other. Typically, if a fluid is used on one or both faces it is air from the ambient environment.

Figure 1:
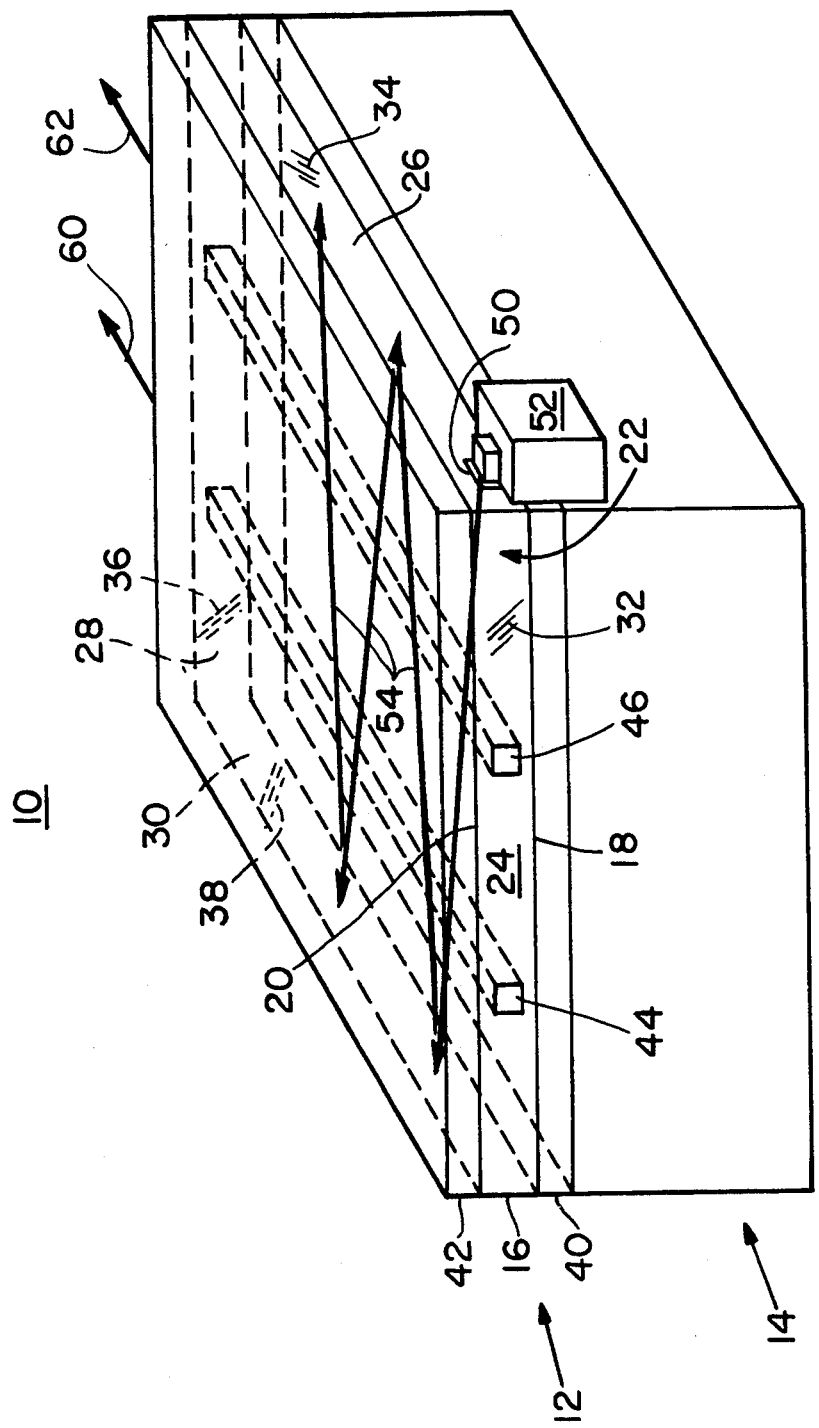
FIG. 1 is a three-dimensional schematic view of a rectangular slab waveguide pumped channel waveguide laser according to this invention, in a planar configuration.

There is shown in FIG. 1 a slab waveguide pumped channel waveguide laser 10 according to this invention which includes a slab waveguide 12 mounted on a substrate 14. The substrate may be made of silicon, aluminum oxide ($Al_2O_3$), or silica ($SiO_2$), for example. Slab waveguide 12 includes a pump guiding layer 16 which may also be thought of as a first cladding. Pump guiding layer 16 includes two opposing faces 18 and 20 and a peripheral edge 22, which in this case, where the waveguide 12 is rectangular in shape, includes four sides 24, 26, 28 and 30, each of which is polished and coated with a reflective coating 32, 34, 36 and 38 to provide a mirrored finish for periphery 22. The coatings may be full mirrored coatings such as gold, aluminum or titanium, or may be wavelength selective dielectric coatings such as MgF/ZnS. Cladding means, which may be thought of as a second cladding, are formed of two solid layers 40 and 42 disposed on faces 18 and 20 of guiding layer 16. Disposed in guiding layer 16 is one or more channel waveguide laser elements 44 and 46. Channel waveguide laser elements 44 and 46 have a square cross-section approximately 5 $\mu$ on a side. The entire slab waveguide pumped channel waveguide laser 10, as shown in FIG. 1, is a square approximately two inches on a side. Channel waveguide lasers 44 and 46 are typically rare earth doped. For example, they may be made of glass such as $Al_2O_3$ plus $Nd_2O_3$ doped silica having an index of refraction $n_1$ of 1.475. The pump guiding layer 16, also known as a first cladding, may be approximately 15 $\mu$ thick, and may also formed of glass such as germanium doped $SiO_2$, with an index of refraction $n_2$ equal to 1.47, slightly less than that of the channel waveguide lasers 44 and 46. The second cladding layers 40 and 42 may be approximately 10 $\mu$ in thickness and may also be formed of glass such as boron doped silicon dioxide ($SiO_2$) with an index of refraction $n_3$ of 1.44, which is slightly lower than that of guiding layer 16.

A window 50 is provided in the mirrored coating on peripheral edge 22. In this case the window 50 is made in coating 34 on side 26. This source of pumping energy is a high power laser diode 52 such as a multiple strip quantum well diode with output powers up to several watts, which will provide, in the case of the $Al_2O_3$ plus $Nd_2O_3$ doped silica channel waveguide lasers, energy having a wavelength of approximately 807 nm. If the channel waveguide laser elements 44 and 46 are erbium doped, the source is called upon to provide 980 nm pumping energy. Whatever the suitable wavelength, the pumping energy enters through window 50 and reflects back and forth repeatedly as illustrated by rays 54 until sufficient energy is absorbed by the one or more channel waveguide laser elements 44 and 46 so that they begin to lase and produce an output as indicated at arrows 60 and 62.

Figure 2:
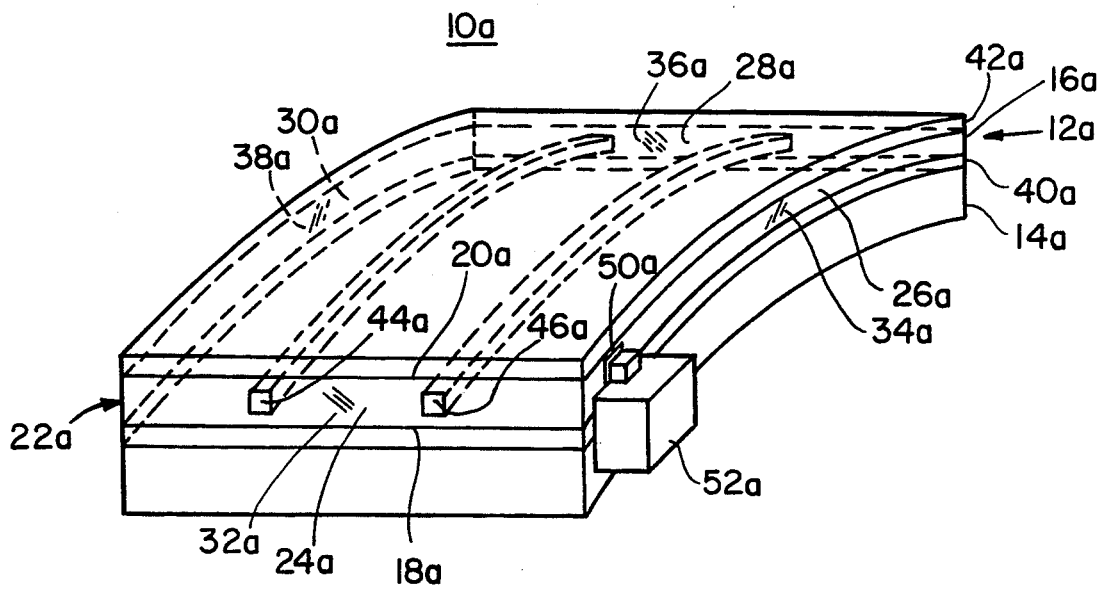
FIG. 2 is a three-dimensional schematic view of a rectangular slab waveguide pumped channel waveguide laser according to this invention in a curved configuration.

Although the slab waveguide pumped channel waveguide laser 10 of FIG. 1 is shown planar in configuration, this is not a necessary limitation of the invention. For example, the entire component can be curved as shown with respect to the slab waveguide pumped channel waveguide laser 10a in FIG. 2, where the substrate 14a, slab waveguide 12a, and all the included layers 16a, 40a and 42a, as well as channel waveguide laser elements 44a and 46a, are all compatibly curved.

Figure 3:
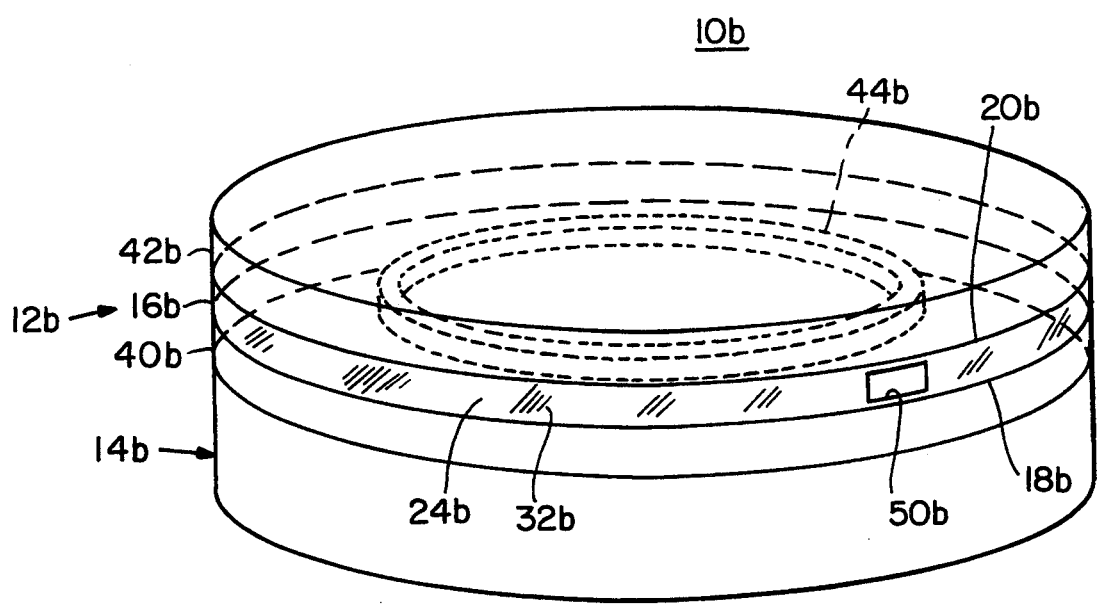
FIG. 3 is a three-dimensional schematic view of a round slab waveguide pumped channel waveguide laser according to this invention.
Figure 4:
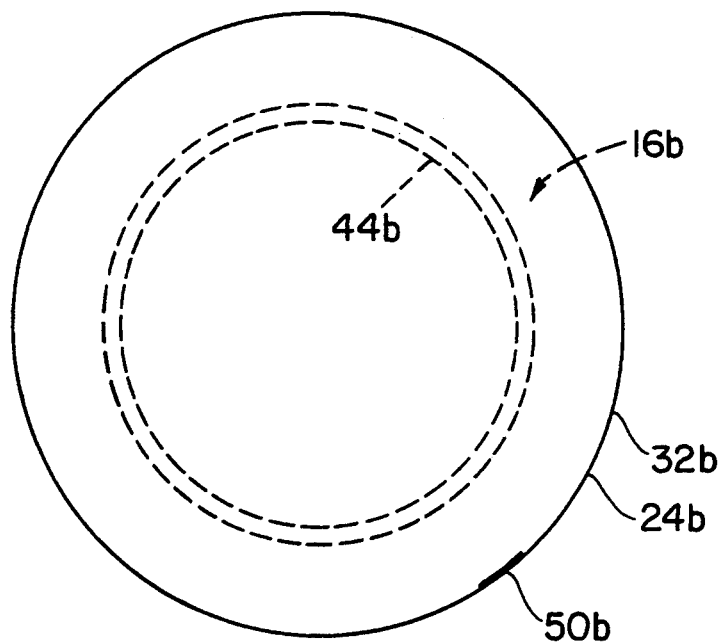
FIG. 4 is a plan view of FIG. 3.

Although the slab waveguide pumped channel waveguide laser according to this invention has thus far been shown as generally rectangular in shape, this is not a necessary limitation of the invention, for as shown in FIG. 3, the entire laser 10b may have a circular shape so that substrate 14b as well as the slab waveguide 12b with all of its layers 16b, 40b and 42b, are circular in shape. Likewise the channel waveguide laser element 44b is a single ring-type laser, as can be seen more clearly in the plan view of FIG. 4. In this case, guiding layer 16b has but a single surface or side 24b with a single mirror coating 32b.

Figure 5:
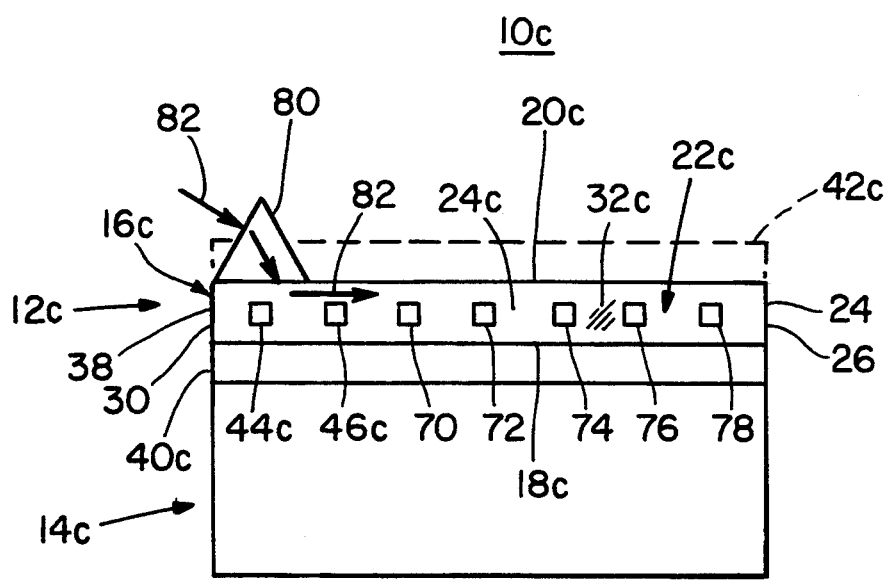
FIG. 5 is a side schematic view of a slab waveguide pumped channel waveguide laser similar to that of FIG. 1 showing a prism coupler on one face for introducing pumping energy.

Although thus far the side pumping action is instituted by a side introduced pumping energy, this is not a necessary limitation of the invention. For example, one or both of the layers surrounding primary pump guiding layer 16 may be fluid such as the ambient air so that either or both of the faces 18 and 20 of guiding layer 16 can be used to introduce the pumping energy. This can be seen in FIG. 5, where guiding layer 16c has a solid cladding layer 40c on its lower face 18c, but on its upper face 20c uses air 42c as the cladding. Air with an index of refraction of 1.0 works well as a waveguide for the energy and it permits a prism 80, a grating or other device to be placed directly on face 20c to create a window to introduce the pumping energy 82 into guiding layer 16c, where it will be repeatedly reflected back and forth between the mirror surfaces and the mirrored coatings 34, 38 of sides 26 and 30, respectively, to side pump the many channel waveguide laser elements 44c, 46c, 70, 72, 74, 76 and 78, until they receive sufficient energy to begin the lasing action.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A slab waveguide pumped channel waveguide laser comprising:

a slab waveguide having a primary pump guiding layer having a first index of refraction and having first and second opposing faces and a peripheral edge including a mirror surface; and cladding means having second index of refraction lower than said first index of refraction proximate said first and second opposing surfaces;

at least one rare earth doped channel waveguide laser having a third index of refraction higher than said first index of refraction disposed in said primary guiding layer; and means for introducing pumping energy into said guiding layer to reflect between said mirror surfaces and energize said laser.

2. The slab waveguide pumped channel waveguide laser of claim 1 in which said primary layer is planar.

3. The slab waveguide pumped channel waveguide laser of claim 1 in which said peripheral edge has four sides.

4. The slab waveguide pumped channel waveguide laser of claim i in which said peripheral edge is circular.

5. The slab waveguide pumped channel waveguide laser of claim 1 in which said cladding means includes a solid cladding layer on one face and a fluid on the other.

6. The slab waveguide pumped channel waveguide laser of claim 1 in which said cladding means includes a solid cladding layer on one face and air on the other.

7. The slab waveguide pumped channel waveguide laser of claim 1 in which said cladding means includes a solid cladding layer on each face.

8. The slab waveguide pumped channel waveguide laser of claim 1 in which said means for introducing includes a window in said mirror surface on said peripheral edge.

9. The slab waveguide pumped channel waveguide laser of claim 1 in which said means for introducing includes a prism on a said face.

* * * * *